July 12, 1955 M. H. MESNER 2,713,149

FREQUENCY MODULATION CIRCUITS

Filed Jan. 15, 1953

INVENTOR.
Max H. Mesner

BY F. A. Rechif
AGENT

United States Patent Office 2,713,149
Patented July 12, 1955

2,713,149

FREQUENCY MODULATION CIRCUITS

Max H. Mesner, Princeton, N. J., assignor to Radio Corporation of America, a corporation of Delaware Application January 15, 1953, Serial No. 331,389

11 Claims. (Cl. 332—18)

Figures 1, 2:
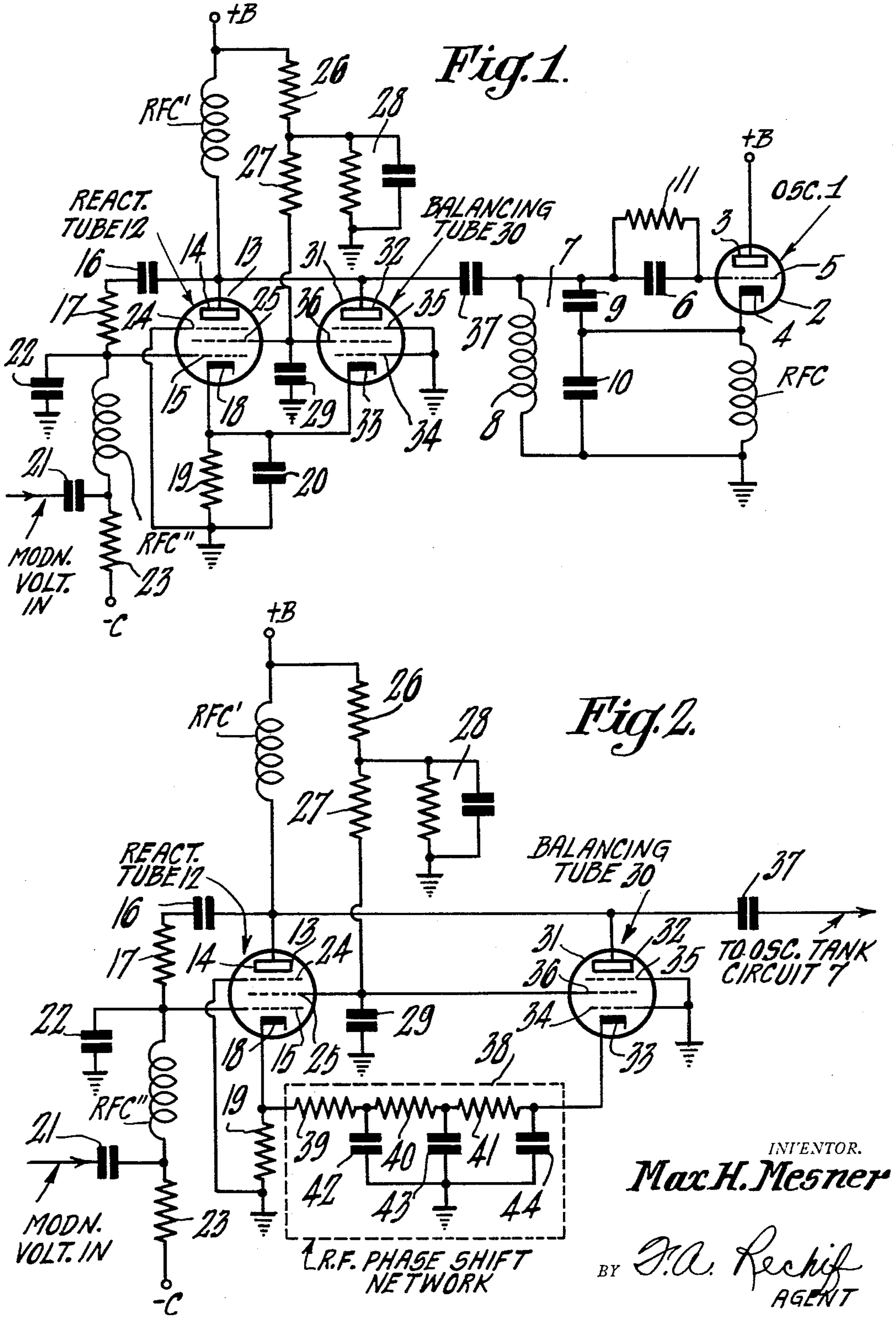

This invention relates to frequency modulation circuits, and more particularly to reactance tube circuits for effecting frequency modulation of an oscillator.

An object of this invention is to provide a novel circuit for frequency modulation of an oscillator which circuit does not produce any substantial amplitude modulation of the oscillator output.

Another object is to reduce the incidental amplitude modulation produced in frequency modulation circuits.

A further object is to devise a reactance tube circuit for frequency modulation which reduces substantially the amount of amplitude modulation produced, yet is considerably simpler than reactance tube circuits of the prior art designed to accomplish a similar function.

The objects of this invention are accomplished, briefly, in the following manner: A reactance tube is coupled to the tank circuit of an oscillator and is supplied with a modulating voltage, all in a more or less conventional manner. A balancing tube has its anode-cathode path connected across the anode-cathode path of the reactance tube and is operated as a grounded grid amplifier, voltages of audio or modulating frequency being applied to the cathode of this tube from the cathode of the reactance tube by means of a common cathode resistor which is unbypassed for these frequencies but is effectively shunted for radio frequencies. In a modification, the common cathode resistor is completely unbypassed and a phase shift network having a phase shift of 180° at radio frequency (R. F.) is connected between the cathodes of the balancing tube and of the reactance tube.

The foregoing as well as other objects of the invention will be best understood from the following description of some exemplifications thereof, reference being had to the accompanying drawings, wherein:

Fig. 1 is a schematic circuit diagram of one embodiment of the present invention; and Fig. 2 is a partial schematic diagram of another embodiment thereof.

In the conventional reactance tube frequency modulation circuit, the application of the modulating voltage causes some incidental amplitude changes in the output of the oscillator being modulated. Heretofore, attempts have been made to reduce this incidental amplitude modulation by one of two different methods, a push-pull balanced reactance tube circuit or a resistance neutralizing circuit. The present invention differs materially from either of these methods, and is simpler and more flexible in application than either conventional neutralization circuits or balanced reactance tube modulators.

Now referring to Fig. 1, an oscillator 1 is the oscillator the output of which is to be frequency modulated. Oscillator 1 is illustrated as including a triode evacuated electron discharge device 2 having an anode 3 connected directly to the positive terminal +B of a source of unidirectional potential and also having a cathode 4 connected to ground or the negative terminal of the unidirectional potential source through a choke RFC. Oscillator 1 is illustrated as a more or less conventional Colpitts oscillator. However, it is pointed out that this is merely for purposes of illustration and other types of oscillators would function equally well in the circuit of this invention. The grid or control electrode 5 of tube 2 is connected through a capacitor 6 to one end of a resonant tank circuit 7 consisting of an inductance 8 shunted by a pair of capacitors 9 and 10 connected in series. Capacitor 6 is shunted by a leak resistor 11. The end of tank circuit 7 opposite to that just referred to is grounded, while cathode 4 is connected to the common junction between capacitors 9 and 10. When proper energizing potentials are applied as described, oscillator 1 functions to produce oscillatory energy of radio frequency in tank circuit 7.

A reactance tube 12, for example a vacuum pentode 13 of the 6AG7 type, has its anode 14 coupled to tank circuit 7 through a coupling capacitor 37, so that R. F. energy is applied to anode 14 from circuit 7. Control grid 15 of tube 13 is connected to anode 14, by way of a coupling capacitor 16, through a 90° phase-shifting network consisting of a resistor 17 and a capacitor 22 connected in series in that order from the lower plate of capacitor 16 to ground. The grid 15 is connected to the junction of resistor 17 and capacitor 22. In this manner, a quadrature R. F. voltage is fed from anode 14 to grid 15. This phase-shifting network could be of other types, if desired. Anode 14 is supplied with operating potential by way of a connection through a choke RFC′ to the positive terminal +B of the source of unidirectional potential. Cathode 18 of tube 13 is connected through a parallel RC network consisting of a resistor 19 and a capacitor 20 to ground. In this way, the anode-cathode path of tube 13 is connected in effect across tank circuit 7 and, due to the quadrature feed of R. F. voltages from anode 14 to control grid 15, an inductive reactance is reflected across the oscillator tank circuit by tube 13, this electronically-generated inductive reactance being capable of variation in response to modulating voltages applied to control grid 15. This is a more or less conventional reactance tube arrangement, with the exception of the RC network 19—20.

Modulation voltages are applied to control grid 15 from a suitable source (not shown), such as an audio frequency amplifier, through a coupling capacitor 21 and a choke RFC″, the grid being negatively biased from a suitable bias potential source —C by way of resistor 23.

The suppressor grid 24 of tube 13 is grounded. The screen grid 25 of tube 23 is supplied with a positive potential from the positive terminal +B of the unidirectional potential source, by way of a pair of series-connected resistors 26 and 27. A filtering network 28 consisting of a paralleled resistor and capacitor is connected from the junction of resistors 26 and 27 to ground. A bypass capacitor 29 is connected from screen 25 to ground.

It will be understood, from the foregoing, that the effective inductive reactance injected by tube 13 into tank circuit 7, or reflected by tube 13 across said tank circuit, is varied in response to modulation voltages applied to control grid 15. In this way, frequency modulation of oscillator 1 is produced. However, there is a resistance component in the quadrature or reactance tube 12 (produced by the shunting effect of the anode resistance of the reactance tube on the tank circuit 7 of the oscillator) which ordinarily introduces serious incidental or parasitic amplitude modulation of the oscillator. Such amplitude modulation is not desired and might become particularly bothersome when a pentode tube (such as tube 13), with a low value of anode resistance, is functioning as a modulator tube. According to this invention, a large portion of the amplitude modulation ordinarily introduced is eliminated or balanced out. As a result, greater frequency swings or deviations are possible without introducing serious amplitude modulation.

In this invention, a separate resistance component balancing tube 30 is utilized, this tube comprising a pentode evacuated electron discharge device 31 which may, for example, be of the same type as tube 13. The anode 32 of device 31 is connected directly to anode 14 of tube 13 and the cathode 33 of device 31 is connected directly to cathode 18 of tube 13, so that the anode-cathode path of tube 31 is connected essentially in parallel with the anode-cathode path of tube 13. Also, anode-cathode energization potentials for tube 31 are obtained in the same way as those for tube 13. Device 31 is connected to operate as a grounded grid amplifier, and for this purpose the control grid 34 of this device is connected to ground, as is also its suppressor grid 35. To provide screen grid potential for tube 31, the screen grid 36 of this tube is connected to screen grid 25, so that screen grid 36 also obtains voltage from the positive terminal of the unidirectional source by way of resistors 26 and 27.

If the cathode resistor 19 were unbypassed, at cathode 18 there would appear voltages of R. F. due to the R. F. (from oscillator 1) flowing in the anode circuit of tube 13, and also voltages of audio or modulation frequency due to the modulation frequencies on the control grid 15. It will be seen that the cathodes 18 and 33 have the resistor 19 in common, and that the voltage at cathode 18 is the same as that at cathode 33. The bypass capacitor 20 across common cathode resistor 19 has such a value of capacitance that it has negligible shunting effect (i. e., very high impedance) across resistor 19 at audio or modulating frequencies, but is essentially a short-circuit (i. e., very low impedance) across resistor 19 at radio frequencies. Under these conditions, voltages of R. F. are bypassed to ground from the cathode 18 of tube 13, and voltages of audio or modulation frequency appearing at the cathode 18 are not bypassed to ground but are applied to cathode 33 to provide cathode drive for the grounded grid amplifier 31.

Since balancing tube 30 is operating as a grounded grid amplifier with cathode drive, the current in the anode circuit of this tube will be in phase with the drive on the cathode 33 and also in phase with the modulation signal on control grid 15 of tube 13, since no phase reversal occurs from grid to cathode of tube 13 and no phase reversal occurs from cathode to anode of a grounded-grid amplifier with cathode drive. Since there is a phase reversal from grid to anode of tube 13, and since the anodes 14 and 32 are connected to a common circuit, the anode current of modulation frequency in tube 31, resulting from the applicataion of modulation frequency to cathode 33, will be exactly out of phase, in the common circuit of anodes 32 and 14, with the anode current of modulation frequency in tube 13. Hence, the anode current of modulation frequency in tube 31 will balance out or cancel the amplitude variations (which will also be of modulation frequency) occurring at the anode 14 of tube 13. In this way, the incidental or parasitic amplitude modulation is cancelled out.

In a circuit constructed according to Fig. 1 and successfully tested, it was found that the frequency swing or frequency deviation of the oscillator could be increased by a factor of three to one as compared to prior art circuits without the balancing tube; even with this threefold increase in deviation the amplitude modulation was reduced by a factor of eighteen to one as compared to prior circuits without the balancing tube.

Fig. 2 is a partial illustration of a modification of the Fig. 1 circuit. In Fig. 2, elements the same as those of Fig. 1 are denoted by the same reference numerals.

In Fig. 2, there is no capacitor across the common cathode resistor 19, so that such resistor is completely unbypassed. This means that both quadrature R. F. currents and currents of audio (modulation) frequency appearing at cathode 18 are not bypassed to ground, but are effectively applied to cathode 33.

In Fig. 2, a phase shift network 38 is connected between cathode 18 and cathode 33. This network is designed to provide a phase shift of 180° for waves of R. F. passing therethrough, but has substantially zero phase shift for waves of audio or modulating frequency passing through the same. In other words, there is a phase shift of 180° between the R. F. wave appearing at cathode 18 and the R. F. wave applied to cathode 33.

One of many forms which the phase shift network 38 may take is illustrated in Fig. 2. The illustration is of a three-section RC network, with three series resistors 39, 40 and 41 and three shunt capacitors 42, 43 and 44 to ground, one capacitor following each of the resistors from the cathode 18 end of the network. In a network of this type, the values of the resistors and capacitors can be made such that a phase shift of 60° (at R. F.) occurs in each section of the network, giving a total phase shift, for the three sections, of 180°.

In Fig. 2, as previously stated, a quadrature R. F. currents are not bypassed to ground, but appear 180° out of phase on the cathode 33 of tube 31 relative to the cathode 18, due to the action of phase shifting network 38. Network 38 thus causes a total phase shift of 180°, from control grid 15 to anode 32, in the R. F. quadrature currents appearing at grid 15, as compared to an exactly equal phase shift of 180° from grid 15 to anode 14. Thus, the amplified R. F. energy (amplified by tube 31) at anode 32 is in phase (in the common circuit of anodes 14 and 32) with the quadrature R. F. energy due to the tube 13, and reinforces the same. This means that, due to this reinforcement of the quadrature R. F. energy, the frequency swing, for a certain modulating voltage, is increased over what it would be if no such reinforcement occurred.

Since network 38 produces substantially no phase shift for voltages of modulation frequency, however, such voltages appearing at cathode 18 are applied with the same phase to cathode 33, and the operation for voltages of these frequencies is essentially similar to that of Fig. 1. In other words, the current of modulation frequency in the anode circuit of balancing tube 30 will be in phase with the drive on cathode 33 and also in phase with the modulation signal applied to control grid 15. Therefore, the anode current of modulation frequency in tube 31, resulting from the application of modulation frequency to cathode 33, will be exactly out of phase, in the common circuit of anodes 32 and 14, with the anode current of modulation frequency in tube 13. Hence, the anode current of modulation frequency in tube 31 will balance out or cancel the amplitude variations (of modulation frequency) occurring at the anode 14 of tube 13. In this way, the incidental or parasitic amplitude modulation is cancelled out.

Some prior art circuits, as previously discussed, required the use of push-pull-connected reactance tubes in order to reduce the undesired amplitude modulation. This meant that, for modulation frequencies down to zero frequency (D. C.), push-pull D. C. amplifiers had to be used; such amplifiers are quite difficult to design and adjust for proper operation. In the circuit of the present invention, since no push-pull stages are used, no push-pull D. C. amplifier stages need be used and the circuit of this invention will easily operate for modulation voltages of zero frequency.

For Fig. 1, the following values of certain constants are given by way of illustration and not by way of limitation. These were the values used in a circuit built according to this invention and successfully tested.

| | | |
|---|---|---|
| Resistor 17 | ohms | 30,000 |
| Resistor 19 | do | 150 |
| Capacitor 20 | mmfd | 150 |
| Cacapitor 22 | mmfd | 150 |

The expression "angular velocity modulation" appearing in the appended claims is intended to include both frequency and phase modulation.

What is claimed is:

1. In an angular velocity modulation system, a resonant circuit wherein oscillatory waves appear, the angular velocity of said waves being variable in response to variations in the resonant frequency of said circuit, an electron flow control device having at least collector and emitter electrodes and having its collector-emitter path across said circuit, said device being connected to produce an electronically-generated reactance across such circuit, means for applying a modulating voltage to said device to vary the reactive effect of said reactance, the application of said modulating voltage tending to cause incidental amplitude variation at modulation frequency of the current wave flowing in the collector electrode circuit, an electron discharge device having anode, cathode and grid electrodes, means connecting said discharge device for operation as a grounded-grid amplifier, means connecting said anode electrode to the collector electrode of the reactance device, and means for applying a modulating voltage wave to said cathode electrode.

2. An angular velocity modulation system in accordance with claim 1, wherein the last-named means comprises a connection between said cathode electrode and said emitter electrode.

3. An angular velocity modulation system in accordance with claim 2, including also means for bypassing to ground voltages of said oscillatory wave frequency appearing at said emitter electrode.

4. An angular velocity modulation system in accordance with claim 2, including also a phase shift network coupled between said emitter electrode and said cathode electrode, said network providing a phase shift of 180° at said oscillatory wave frequency.

5. In a frequency modulation system, a resonant circuit wherein oscillatory waves appear, the frequency of said waves being variable in response to variations in the resonant frequency of said circuit, an electron flow control device having at least collector, emitter and control electrodes, means connecting the collector-emitter path of said device across said circuit, thereby to apply oscillatory waves to the collector-emitter circuit, means for connecting said control electrode to said resonant circuit, said last-named means including a phase shifter for supplying oscillatory waves to said control electrode in phase quadrature with those supplied to said collector electrode, whereby said device reflects an electronically generated reactance across said resonant circuit, means for applying a modulating voltage to said control electrode to vary the reactive effect of said reactance, the application of said modulating voltage tending to cause incidental amplitude variation at modulation frequency of the current wave flowing in the collector electrode circuit, an electron discharge device having anode, cathode and grid electrodes, means connecting said discharge device for operation as a grounded-grid amplifier, means connecting said anode electrode to the collector electrode of the reactance device, and means for applying a modulating voltage to said cathode electrode.

6. A frequency modulation system in accordance with claim 5, wherein the last-named means comprises a connection between said cathode electrode and said emitter electrode.

7. A frequency modulation system in accordance with claim 6, including also means for bypassing to ground voltages of said oscillatory wave frequency appearing at said emitter electrode.

8. A frequency modulation system in accordance with claim 6, including also a phase shift network coupled between said emitter electrode and said cathode electrode, said network providing a phase shift of 180° at said oscillatory wave frequency.

9. In a frequency modulation system, a resonant circuit wherein oscillatory waves appear, the frequency of said waves being variable in response to variations in the resonant frequency of said circuit, an electron discharge device having at least anode, cathode and control electrodes, means connecting the anode-cathode path of said device across said circuit, thereby to apply oscillatory waves to the anode-cathode circuit, means for connecting said control electrode to said resonant circuit, said last-named means including a phase shifter for supplying oscillatory waves to said control electrode in phase quadrature with those supplied to said anode electrode, whereby said device reflects an electronically-generated reactance across said resonant circuit, means for applying a modulating voltage to said control electrode to vary the reactive effect of said reactance, the application of said modulating voltage tending to cause incidental amplitude variation at modulation frequency of the current wave flowing in the anode electrode circuit, another electron discharge device having anode, cathode and grid electrodes, means connecting said other device for operation as a grounded-grid amplifier, means connecting said last-named anode electrode to the anode electrode of the first-named device, and a connection between said last-named cathode electrode and the cathode electrode of the first-named device, thereby to apply a modulating voltage wave to the cathode electrode of said other device.

10. A frequency modulation system in accordance with claim 9, including also means for bypassing to ground voltages of said oscillatory wave frequency appearing at the cathode electrode of the first-named device.

11. A frequency modulation system in accordance with claim 9, including also a phase shift network coupled between the cathode electrode of the first-named device and the cathode electrode of said other device, said network providing a phase shift of 180° at said oscillatory wave frequency.

References Cited in the file of this patent

UNITED STATES PATENTS

| | | |
|---|---|---|
| 2,310,260 | Schock | Feb. 9, 1943 |
| 2,392,625 | Usselman | Jan. 8, 1946 |